(12) United States Patent  (10) Patent No.: US 7,094,987 B2
Stager  (45) Date of Patent: Aug. 22, 2006

(54) HOLLOW THERMAL SPRAY ELECTRODE WIRE HAVING MULTIPLE LAYERS

(75) Inventor: Dale M. Stager, Troy, OH (US)

(73) Assignee: Select-Arc, Inc., Ft. Loramie, OH (US)

( * ) Notice: Subject to any disclaimer, the term of this patent is extended or adjusted under 35 U.S.C. 154(b) by 0 days.

(21) Appl. No.: 11/109,833

(22) Filed: Apr. 19, 2005

(65) Prior Publication Data

US 2005/0242069 A1    Nov. 3, 2005

Related U.S. Application Data

(60) Provisional application No. 60/563,612, filed on Apr. 20, 2004.

(51) Int. Cl.
    *B23K 10/00* (2006.01)
(52) U.S. Cl. .............. 219/121.47; 219/76.16; 219/76.15; 219/119
(58) Field of Classification Search .......... 219/121.47, 219/76.15, 76.16, 76.1, 85.14, 91.2, 119, 219/145.22, 146.1, 146.23, 146.22
See application file for complete search history.

(56) References Cited

U.S. PATENT DOCUMENTS

| 4,800,131 | A | * | 1/1989 | Marshall et al. ............. 428/558 |
| 5,514,422 | A | * | 5/1996 | McCune ..................... 427/449 |
| 5,820,939 | A | * | 10/1998 | Popoola et al. ............. 427/449 |
| 6,933,468 | B1 | * | 8/2005 | Keegan et al. ......... 219/145.22 |

* cited by examiner

*Primary Examiner*—Mark Paschall
(74) *Attorney, Agent, or Firm*—Stockwell & Smedley, PSC

(57) ABSTRACT

An electrode wire for use in a thermal spray process. The electrode wire is formed with a first layer of a first material formed as tubular outer layer and a second layer of a second material, different from the first material, formed as a tubular inner layer located inside the tubular outer layer. The tubular inner layer includes in an outer surface which is located in substantially uniform contact at an interface with an inner surface of the tubular outer layer. The interface between the inner and outer layers is defined by a mechanical bond between the materials of the inner and outer layers. In a method of performing a thermal spray process the electrode wire is caused to vaporize and spray on a substrate surface to form a bondcoat on the substrate surface.

16 Claims, 2 Drawing Sheets

HOLLOW THERMAL SPRAY ELECTRODE WIRE HAVING MULTIPLE LAYERS

This application claims the benefit of priority in U.S. provisional application Ser. No. 60/563,612 filed on Apr. 20, 2004.

BACKGROUND OF THE INVENTION

1. Field of Invention

The present invention relates to thermal spray processes and, more particularly, to a composite electrode wire construction for use in an electric arc thermal spray process.

2. Description of the Related Prior Art

A thermal sprayed coating is a surface layer that comprises a protective coating to a substrate which is generally highly resistant to wear, erosion, abrasion and corrosion. In an electric arc thermal spraying process, a DC electric arc is used to directly melt consumable electrode wires. Specifically, in twin wire-arc spraying, the electric current is carried by two electrically conductive, consumable wires. An electric arc is created between the wire tips across a gap created by the continuous convergence of the two wires. A gas jet blows from behind the converging electrodes and transports the molten metal that continuously forms as the wires are melted by the electric arc. The gas jet breaks up or atomizes the molten metal and directs it toward a substrate. As the sprayed particles impinge on the substrate, they cool and accumulate into a hard coating on the surface of the substrate. The gas jet may comprise air, oxygen, argon, or other gases, depending on the requirements of the application.

In the past, electrode wires formed of a combination of nickel and aluminum have commonly been used to provide the thermal spray material, where the weight percentage of nickel is substantially larger than the weight percentage of aluminum. In particular, the aluminum functions to act as a fluxing material for cleaning the substrate surface as well as a bonding material which forms a surface layer on the substrate to which the hard nickel material can adhere. The material forming the thermal spray coating is known as a "bondcoat" material, and generally includes a minimum of 5% aluminum with the balance of the material being nickel. A common composition for nickel/aluminum electrode wires comprises approximately 85% nickel and 15% aluminum, and the electrode wires are formed in a variety of constructions including solid wires comprising a combination of nickel and aluminum, or as tubular wires comprising an outer tube of nickel containing either a solid aluminum wire or an aluminum powder. Solid wire electrodes are generally more expensive and have lower productivity than the tubular electrode wire constructions. However, known tubular wire electrodes, although less expensive, also suffer from problems resulting in process inefficiencies. For example, it has been found that electrodes formed with a nickel tube containing an aluminum powder have the disadvantage that the aluminum powder is more volatile than solid aluminum and the particles forming the powder provide a larger surface area resulting in the powder interfering with the thermal efficiency of the spray process, which retards the efficiency of the thermal spray coating application. The tubular electrodes having a solid aluminum wire core require that the solid aluminum wire be fit in tight contact within the surrounding nickel tube, in that separations between the core and the outer surface of the electrode will result in discontinuities in the electrical current supplied to the electrode tip and associated inconsistencies in melting of the electrodes.

Accordingly, there is a need for a thermal spray electrode which ensures consistent application of a thermal spray coating and which facilitates the productivity of the thermal spray operation.

SUMMARY OF THE INVENTION

The present invention provides a composite electrode wire construction for use in a thermal spray coating operation to form a bondcoat of the electrode material on a substrate, and a thermal spray operation using the composite electrode.

In accordance with one aspect of the invention an electrode wire is provided for use in a thermal spray process. In one embodiment, the electrode wire comprises a first layer of a first material formed as tubular outer layer, and a second layer of a second material, different from the first material, formed as a tubular inner layer located inside the tubular outer layer. An outer surface of the tubular inner layer is located in substantially uniform contact at an interface with an inner surface of the tubular outer layer.

In accordance with another aspect of the invention, a method of performing a thermal spray process is provided including the steps of: a) providing an electrode wire comprising: a first layer of a first material formed as tubular outer layer; and a second layer of a second material, different from the first material, formed as a tubular inner layer located inside the tubular outer layer; and b) causing the electrode wire to vaporize and spray on a substrate surface to form a bondcoat on the substrate surface.

DETAILED DESCRIPTION OF THE PREFERRED EMBODIMENT

Figure 1:
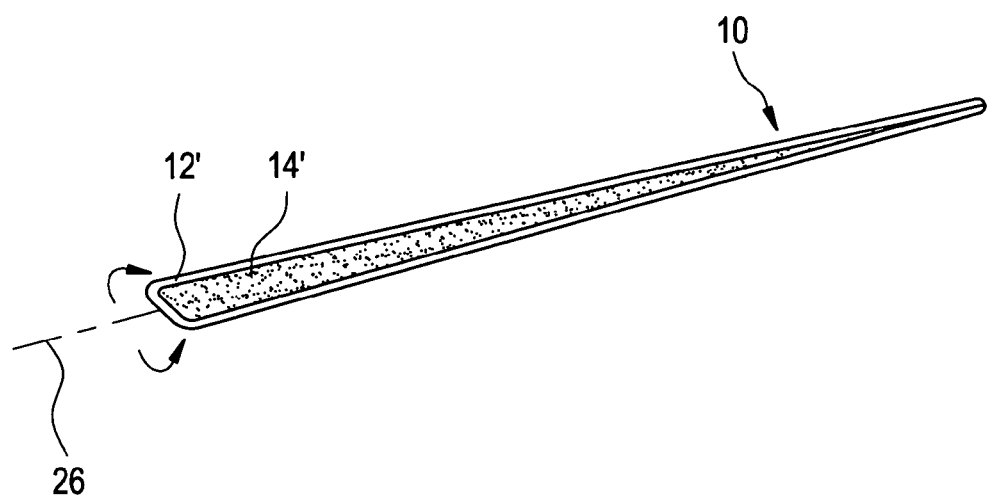
FIG. 1 illustrates the material strips for forming the electrode wire of the present invention partially formed into an electrode wire.
Figure 2:
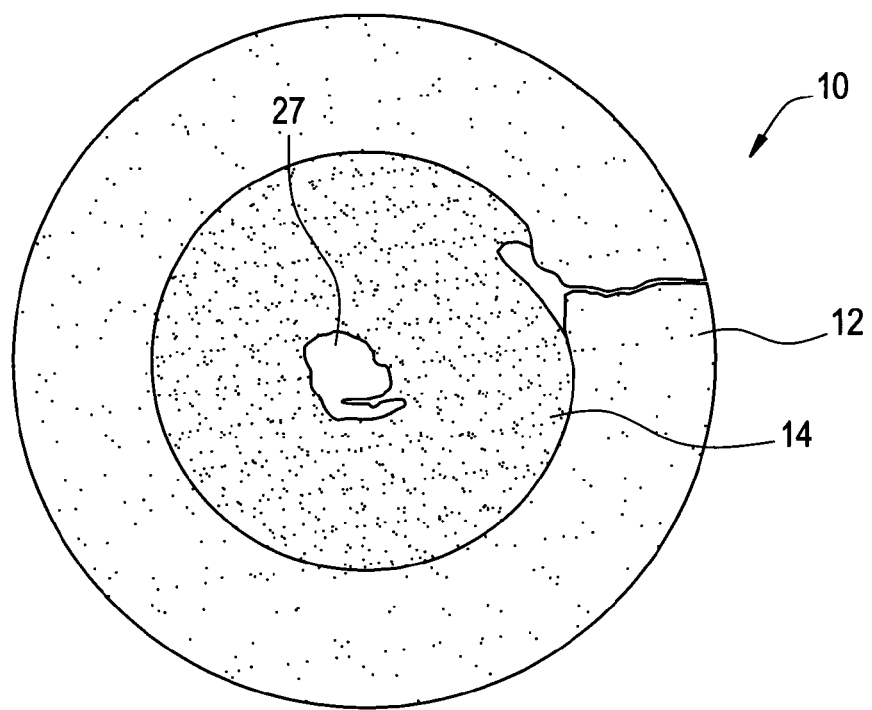
FIG. 2 is a cross-sectional view through the electrode wire of the present invention.

Referring to FIGS. 1 and 2, the electrode wire 10 of the present invention comprises a tubular member including a first layer 12 of a hard coating material and a second layer 14 of a bonding material. In the illustrated embodiment, the first layer 12 is provided as an outer layer and is formed of nickel, and the second layer 14 is provided as an inner layer formed of aluminum and having an outer surface 16 located in contact with the inner surface 18 of the first layer 12. Accordingly, the first layer 12 defines an outer tube of material for the electrode wire 10 and the second layer 14 defines an inner tube of material for the electrode wire 10, where the first and second layers 12, 14 are formed of different materials for fulfilling different functions in a thermal spray operation.

As can be best seen in FIG. 2, the outer surface 16 of the second layer 14 is in uniform or continuous contact with inner surface 18 of the first layer 12 along substantially the entire circumference of the electrode wire 10. Further, the contact between the first and second layers 12, 14, illustrated in FIG. 2, is substantially continuous along the entire length of the electrode wire 10, thereby ensuring consistent conduction of electricity along the length and through both layers 12, 14 of the electrode 10.

Figure 3:
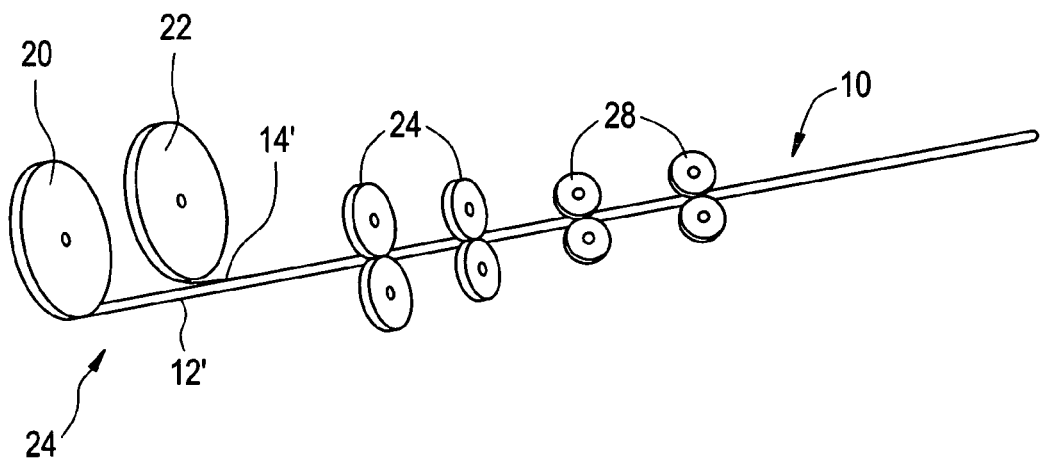
FIG. 3 is a diagrammatic view of a process for forming the electrode wire.

Referring to FIG. 3, a process for producing the electrode wire 10 is illustrated diagrammatically. A first material supply roll 20 for supplying strip material 12' for the first layer 12 and second material supply roll 22 for supplying strip material 14' for the second layer 14 are located at an input end 24 of the process. The material 12', 14' from the first and second supply rolls 20, 22 is fed simultaneously, in overlaying relationship to each other, to sets of forming rolls 24 where the strips of material 12', 14' are formed by bending the materials 12', 14' about an axis 26 (FIG. 1) defined along the length direction of the materials 12', 14'. Thus, the materials 12', 14' are simultaneously shaped into a tubular form. The material 12' is positioned on the inside of the curvature of the forming operation such that the material 14' wraps around the material 12' as the forming operation proceeds, resulting in the concentric formation of the second layer 14 inside the first layer 12 with a hollow inner area 27 defined by an inner surface 17 of the inner tubular (second) layer within the second layer 14.

Subsequently, the concentrically formed layers 12, 14 are passed through further rollers 28 for performing a drawing operation on the layers 12, 14. The drawing operation reduces the diameter of the concentrically formed layers 12, 14 to a final desired diameter for the electrode wire 10. Additionally, it should be noted that the drawing operation presses the materials 12', 14' into a strong mechanical bond between the two materials 12', 14' whereby the uniform or continuous contact between the first and second layers 12, 14 at the interface of the respective surfaces 18, 16 is defined.

In one embodiment, the preferred materials for the first or tubular outer layer and second tubular inner layer 12, 14 may comprise of nickel and aluminum, respectively. Specifically, the electrode wire 10 may comprise from about 95% to about 80% by weight nickel and from about 5% to about 20% by weight aluminum. In a preferred application of the invention, the electrode wire 10 comprises from about 85% nickel and about 15% aluminum. The dimensions of the material strips 12', 14' may comprise from about the following:

|  | Width (inches) | Thickness (inches) |
| --- | --- | --- |
| Nickel | 0.325–0.425 | 0.014–0.018 |
| Aluminum | 0.280–0.320 | 0.010–0.015 |

The diameter of the electrode wire 10 in a preferred application is approximately about 0.0625 (1/16) inches. However, other diameters may be provided by changing the amount that the concentrically formed materials 12', 14' are drawn by the rolls 28. For example, the diameter of the electrode wire may alternatively be drawn to a larger diameter of approximately 0.0938 (3/32) inches. It should be noted that the relative percentage of the material in the first and second layers 12, 14 is determined by the dimensions of the supplied material 12', 14' and that these relative percentages will be maintained throughout the operation of drawing the electrode wire 10 to its final dimensions.

It should also be noted that variations in the material of the first layer 12 may be provided, including forming the first layer of an alloy, such as for example about 80% nickel and about 20% copper. Alternatively, the first layer 12 may be formed of steel.

Figure 4:
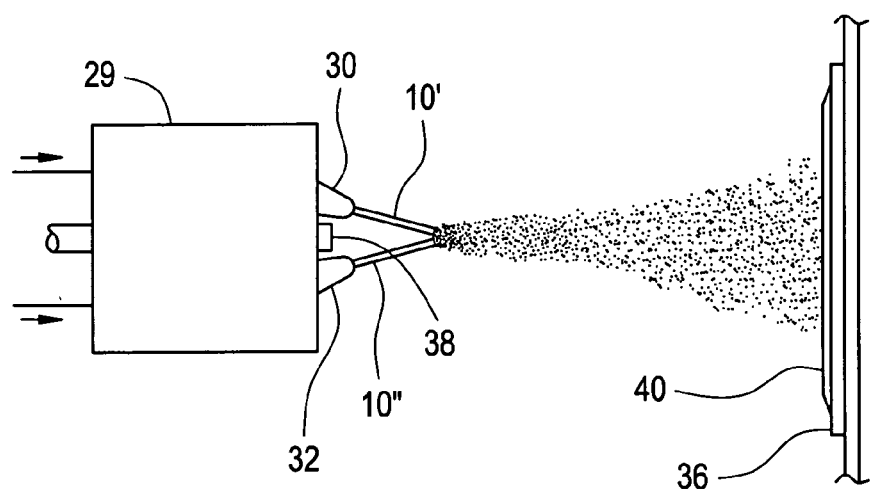
FIG. 4 illustrates a thermal spray process utilizing the electrode wire of the present invention.

Referring to FIG. 4 a thermal spray operation utilizing the electrode wire 10 of the present invention is illustrated. A thermal spray gun 29 is provided including first and second contact tubes 30, 32 for guiding first and second electrode wires 10', 10" toward each other at an arc location 34. The electrode wires 10', 10" are continuously fed forward through the contact tubes 30, 32 by drive members (not shown). The first and second contact tubes 30, 32 are connected to opposite polarities of a voltage source (not shown) and the voltage carried by the contact tubes 30, 32 is conducted to the respective electrode wires 10', 10", such that an electrical arc is formed between the tips of the electrode wires 10', 10" at the arc location 34. The material at the tips of the electrodes 10', 10" is vaporized by the arcing, and the vaporized material is directed to a substrate surface 36 by a jet stream of gas, such as air, issuing from a nozzle 38, thereby providing a bondcoat 40 of the nickel/aluminum electrode material on the substrate surface 36.

The complete vaporization of the material of the electrodes 10', 10" is facilitated by providing the hollow electrode structure of the present invention, which enables the second layer 14 of the electrode to be vaporized in the arc location 34 more readily than a solid wire of the same material. As a result, the relative percentages of the materials of the first and second layers 12, 14 is maintained more precisely for deposition on the substrate surface 36 to improve the quality of the bondcoat thus formed, and improve productivity of the thermal spray operation.

Having described the invention in detail and by reference to a preferred embodiment thereof, it will be apparent that modifications and variations are possible without departing from the scope of the invention defined in the appended claims.

What is claimed is:

1. An electrode wire for use in a thermal spray process, comprising:
   a first layer of a first material formed as a tubular outer layer; and
   a second layer of a second material, different from the first material, formed as a tubular inner layer located inside the tubular outer layer;
   wherein an outer surface of the tubular inner layer is located in substantially uniform contact at an interface with an inner surface of the tubular outer layer;
   and further wherein both first and second layers are formed simultaneously and concentrically about a common axis.

2. The electrode wire of claim 1, further comprising an inner hollow area defined by an inner surface of the inner tubular layer.

3. The electrode wire of claim 1, wherein the first material of the first layer comprises a preselected amount of suitable metal or metal alloy.

4. The electrode wire of claim 3, wherein the suitable metal or metal alloy is selected from the group consisting of, nickel, steel, and an alloy of nickel and copper.

5. The electrode wire of claim 4, wherein the suitable metal is nickel and the preselected amount is between about 80% to about 95% by weight.

6. The electrode wire of claim 5, wherein the suitable metal is nickel and the preselected amount about 85%.

7. The electrode wire of claim 4, wherein the suitable metal alloy is comprised of nickel and copper.

8. The electrode wire of claim 4, wherein the suitable metal or metal alloy is steel.

9. The electrode wire of claim 1, wherein the second material of the second layer comprises a preselected amount of suitable metal or metal alloy.

10. The electrode wire of claim 9, wherein the suitable metal or metal alloy is aluminum.

11. The electrode wire of claim 9, wherein the suitable metal is aluminum and the preselected amount is between about 5% to about 20% by weight.

12. The electrode wire of claim 11, wherein the suitable metal is aluminum and the preselected amount is about 15%.

13. A method of performing a thermal spray process including the steps of:
   a) providing an electrode wire comprising:
      a first layer of a first material formed as a tubular outer layer;
      a second layer of a second material, different from the first material, formed as a tubular inner layer located inside the tubular outer layer wherein both first and second layers are formed simultaneously and concentrically about a common axis; and
   b) causing the electrode wire to vaporize and spray on a substrate surface; thereby
   c) forming a bondcoat on the substrate surface.

14. A method of manufacturing a wire for use in a thermal spray process, comprising:
   arranging first and second supply rolls to supply first and second strip materials;
   simultaneously bending the first and second strip materials about an axis to form a concentric wire combination;
   performing the bending step using form-rollers;
   leaving a center portion of the concentric wire combination to be unfilled and hollow;
   passing the concentric wire combination through drawing rollers, thereby reducing the diameter of the concentric wire combination.

15. A method of thermal-spraying a substrate, comprising:
   locating first and second contact tubes on opposite sides of a substrate to be bondcoated;
   positioning first and second electrode wires within the first and second contact tubes, respectively;
   driving the wires through the contact tubes using a driving means;
   connecting the contact tubes to opposite polarities of a voltage source, thereby forming an electrical arc between the tips of the first and second electrode wires;
   vaporizing the tips of the first and second electrode wires into a spray material;
   directing the spray material toward a surface of the substrate;
   vaporizing completely the tips of the first and second electrode wires; and
   advancing new unvaporized portions of the first and second electrode wires through the contact tubes.

16. The method of claim 15, further comprising:
   performing said directing step using a jet stream of a gas.

* * * * *